Nov. 10, 1959  E. S. STODDARD  2,912,372
WATER TREATMENT METHODS
Original Filed May 12, 1955
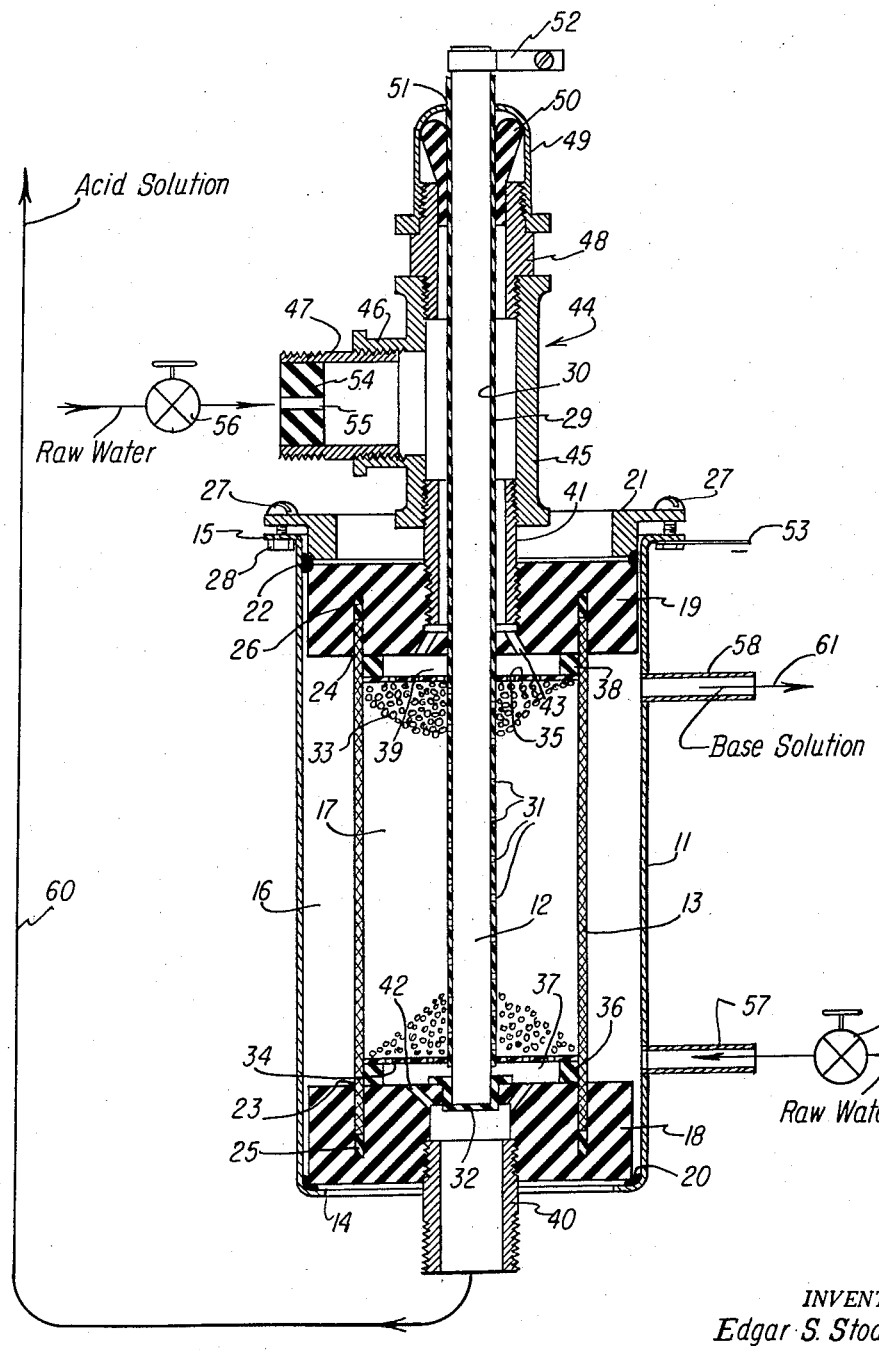
INVENTOR.
Edgar S. Stoddard
BY
Smith, Olsen, Baird & Miller
Attys.

United States Patent Office 2,912,372
Patented Nov. 10, 1959

2,912,372

WATER TREATMENT METHODS

Edgar S. Stoddard, Berwyn, Ill., assignor to General Electric Company, a corporation of New York Original application May 12, 1955, Serial No. 507,805, now Patent No. 2,825,666, dated March 4, 1958. Divided and this application December 29, 1955, Serial No. 556,196

9 Claims. (Cl. 204—151)

The present invention relates to water treatment methods, and more particularly to such methods that are especially designed to convert raw water containing dissolved mineral salts into corresponding aqueous acid and base solutions. This application is a division of the copending application of Edgar S. Stoddard, Serial No. 507,805, filed May 12, 1955, now Patent No. 2,825,666, granted March 4, 1958.

It is the general object of the invention to provide an improved method of treating ordinary hard water for the purpose of producing separate and distinct aqueous acid and base solutions therefrom.

Another object of the invention is to provide a water treatment method that involves simultaneous ion exchange and electrodialysis steps.

A further object of the invention is to provide a water treatment method in which there is produced separate aqueous acid and base solutions in a ready and simple manner from ordinary hard water without attention on the part of the operator, whereby the method may be carried out in a dishwasher or other home appliance.

Further features of the invention pertain to the particular arrangement of the steps of the method, whereby the above-outlined and additional operating features thereof are attained.

The invention, both as to its organization and method of operation, together with further objects and advantages thereof, will best be understood by reference to the following specification taken in connection with the accompanying drawing, in which the single figure is a vertical sectional view of a water treatment unit in which the method of the present invention may be carried out.

Referring to the drawing, the water treatment unit 10 there illustrated, comprises an upstanding substantially cylindrical outer tubular casing 11 formed of stainless steel and constituting a cathode, an upstanding substantially rod-like member 12 formed of carbon and constituting an anode, and an upstanding substantially cylindrical tubular permeable diaphragm or barrier 13 formed of ceramic material and arranged in interposed relation with respect to the anode 11 and the anode 12 and concentric therewith. The lower end of the cathode 11 is provided with an inwardly directed annular flange 14 and the upper end of the cathode 11 is provided with an outwardly directed annular flange 15; and preferably the anode 12 is arranged along the longitudinal axis of the unit. Thus the cathode 11 cooperates with the barrier 13 to define a substantially annular cathode chamber 16 therebetween, and the anode 12 cooperates with the barrier 13 to define a substantially annular anode chamber 17 therebetween.

The opposite lower and upper ends of the cathode 11 are closed by a pair of longitudinally spaced-apart substantially disk-like insulating plates 18 and 19. The lower plate 18 is supported upon the lower flange 14 with an annular sealing gasket 20 arranged therebetween; and the upper plate 19 is secured in place by an associated clamping ring 21 disposed thereabove, an annular sealing gasket 22 being arranged mutually between the upper plate 19, the clamping ring 21 and the adjacent upper end wall of the cathode 11. More particularly, the barrier 13 is clamped in position between the plates 18 and 19 by the arrangement including the clamping ring 21, the upper face of the lower plate 18 having an annular groove 23 therein receiving the adjacent lower end of the barrier 13, and the lower face of the upper plate 19 having an annular groove 24 therein receiving the adjacent upper end of the barrier 13. In the arrangement, two sealing gaskets 25 and 26 are respectively arranged in the grooves 23 and 24 and respectively engage the lower and upper ends of the barrier 13, thereby to form a liquid-tight seal between the cathode chamber 16 and the anode chamber 17. The clamping ring 21 may be secured in place to the adjacent annular flange 15 therebelow by a plurality of screws 27 provided with associated nuts 28 in order to complete the assembly. In the arrangement, the plates 18 and 19 may be formed of phenol-formaldehyde condensation products; the gaskets 20, 22, 25 and 26 may be formed of neoprene; and the clamping ring 21 may be formed of any suitable material.

The anode 12 extends through longitudinally spaced-apart and aligned openings formed in the central portions of the plates 18 and 19; and preferably the major portion of the anode 12 is jacketed by a tubular sleeve 29 of insulating material. The upper portion of the sleeve 29 extending through the central opening provided in the upper plate 19 to the exterior of the anode chamber 17 is imperforate and suitably cemented in liquid-tight relation to the adjacent upper portion of the anode 12, as indicated at 30; while the lower portion of the sleeve 29 extending into the anode chamber 17 is perforated, as indicated at 31, to accommodate contact of the anode 12 by the anolyte in the anode chamber 17. The extreme lower end of the anode 12 is positioned in the central opening provided in the lower plate 18 by an intervening substantially cup-shaped supporting member 32. In the arrangement, the sleeve 29 and the cup 32 may be formed of phenol-formaldehyde condensation products.

Also an ion exchange bed, indicated at 33, is arranged within the barrier 13 and embedding the anode 12. In order clearly to define the bed 33 and to retain the same in place a pair of longitudinally spaced-apart substantially disk-shaped recticulated plates or screens 34 and 35 are respectively arranged in the lower and upper portions of the anode chamber 17 within the barrier 13 and in surrounding relation with respect to the anode 12; the lower plate 34 is spaced somewhat above the lower plate 18 by an interposed spacing ring 36 to define an annular chamber 37 therebetween; and likewise, the upper plate 35 is spaced somewhat below the upper plate 19 by an interposed spacing ring 38 to define an annular chamber 39 therebetween. In the arrangement, the plates 34 and 35, as well as the spacing rings 36 and 38, may be formed of phenol-formaldehyde condensation products. Preferably, the porous bed 33 completely fills the space within the anode chamber 17 defined mutually between the sleeve 29 and the barrier 13 and the upper and lower plates 34 and 35; the holes provided in the plates 34 and 35 are of the same size in order to prevent pressure differentials between the chambers 39, 17 and 37 when the anolyte is passing in a stream through the anode chamber 17, the holes provided in the plates 34 and 35 being sufficiently small to prevent the excape of the individual particles of the porous bed 33 from the anode chamber 17.

The outer ends of the central openings formed in the plates 18 and 19 are threaded and respectively receive the threaded ends of lower and upper tubular elements 40 and 41 respectively arranged in liquid-tight relation therewith. An annular array of holes 42 is provided in the lower plate 18 and communicating between the upper end of the tubular element 40 and the annular chamber 37; and likewise, an annular array of holes 43 is provided in the upper plate 19 and communicating between the lower end of the tubular element 41 and the annular chamber 39. The extreme lower end of the tubular member 40 is threaded in order to receive any desired connecting fitting; and likewise, the extreme upper end of the tubular member 41 is threaded and carries a substantially T-shaped fitting 44 having a longitudinally extending hollow head 45 surrounding the anode 12 and a laterally extending stem 46 receiving the threaded inner end of a tubular member 47, the outer end of the tubular member 47 being threaded to receive any desired connecting fitting. The upper end of the head 45 is threaded and receives the lower end of a longitudinally extending tubular member 48 also surrounding the anode 12. The upper end of the tubular member 48 is threaded and receives an inverted substantially cup-shaped fitting 49 also surrounding the anode 12. A substantially sleeve-like compressible sealing gasket 50, that may be formed of neoprene, is arranged within the upper end of the tubular member 48 and within the fitting 49 in surrounding relation with the sleeve 29 and retained in compression by the fitting 49 in order to provide a liquid-tight joint or gland closing the upper end of the tubular member 48 and sealing the same with respect to the exterior. The extreme upper end of the sleeve 29 and the anode 12 project through a central opening 51 provided in the fitting 49 to the exterior; and the extreme upper end of the anode 12 projects beyond the extreme upper end of the sleeve 29 and carries a terminal strap or fixture 52 that is adapted to be connected to the ungrounded positive terminal of a direct current source of supply. Also a terminal strap 53 is secured to the cathode 11 and adapted to be connected to the grounded negative terminal of the direct current source of supply mentioned.

Further, the unit 10 is provided with a flow control device that may take the form of a plug 54 arranged in the outer end of the tubular member 47 and having a centrally disposed opening 55 formed therethrough; the body of the plug 54 being formed of resilient material, such, for example, as neoprene, or the like, so that the configuration thereof may be somewhat distorted in response to an abnormal pressure in the associated inlet supply connection, not shown, so as to reduce the effective cross-sectional area of the hole 55 therethrough with the contracting flow-regulating effect with respect to the passage of water into the fitting 44. In other words, the flow control plug 54 is designed to accommodate the passage through the hole 55 of a substantially fixed flow of water when the tubular member 47 is connected to household plumbing involving the usual water pressures encountered therein, a conventional manually operable valve 56 being arranged in the plumbing connection mentioned preceding the tubular member 47. Two conduits 57 and 58 are respectively secured in liquid-tight relation with lower and upper openings provided in the wall of the cathode 11 and communicating with the respective lower and upper ends of the cathode chamber 16, the conduit 57 being connected to the household plumbing and including a manually operable valve 59. The tubular element 40 is connected to upstanding conduit structure 60 to which the acid solution is supplied from the anode chamber 17; and the conduit 58 is connected to conduit structure 61 to which the base solution is supplied from the cathode chamber 16. In the arrangement, the conduit structure 60 is disposed in upstanding relation and extends above the anode chamber 17 so as to insure that the porous ion exchange bed 33 is saturated at all times with the acid solution in the anode chamber 17.

In the construction of the unit 10, it will be understood that after removal of the fitting 49 from the tubular member 48, the anode 12, together with the sleeve 29, may be withdrawn from the upper end of the fitting 44 for adjustment, repair or replacement, as required. When the valve 56 occupies its open position, a controlled flow of water into the tubular member 47 is effected by the flow control plug 54 and thence downwardly through the anode chamber 17 and from the tubular member 40 and thus upwardly through the conduit structure 60 to the exterior; and similarly, when the valve 59 occupies its open position, water flows through the conduit 57 upwardly through the cathode chamber 16 and out of the conduit 58. Accordingly, the stream of water flowing downwardly through the anode chamber 17 is in counterflow with respect to the stream of water flowing upwardly through the cathode chamber 16. The stream of water flowing through the anode chamber 17 readily penetrates the porous ion exchange bed 33 therein and is in wetting relation therewith and with the barrier 13, as well as the anode 12 by virtue of the perforations 31 provided in the insulating sleeve 29. Similarly, the stream of water flowing through the cathode chamber 16 is in wetting relation with the barrier 13 and the cathode 11. As explained more fully hereinafter, the stream of water flowing through the anode chamber 17 constitutes an anolyte that is an aqueous acid solution, while the stream of water flowing through the cathode chamber 16 constitutes a catholyte that is an aqueous base solution.

The elements 44, etc., are also connected to ground potential; whereby the ungrounded anode 12 is completely electrically insulated from the grounded cathode 11 and from the elements 44, etc.; whereby the application of positive potential between the anode 12 and the cathode 11 effects an electrolytic action upon the two streams of water respectively traversing the chambers 16 and 17 and upon the ion exchange bed 33.

Turning now to the composition of the ion exchange bed 33, it preferably comprises a mixed bed of discrete particles of cation exchange material and discrete particles of anion exchange material, although it may comprise only discrete particles of cation exchange material. Specifically, it is preferable that the porous bed 33 comprises first discrete particles of a synthetic organic polymeric cation exchange resin and second discrete particles of a synthetic organic polymeric anion exchange resin, the two types of particles being heterogeneously mixed (about 50%–50% by volume) in the mass of the bed 33, thereby producing approximately equal cation exchange and anion exchange capacities.

More particularly, this cation exchange resin is of bead-like formation and may comprise the strong-acid resin sold by Rohm and Haas under the name "Amberlite IR-120," and this anion exchange resin is of bead-like formation and may comprise the strong-base resin sold by Rhom and Haas under the names "Amberlite IRA-400" and "Amberlite IRA-410." A cation exchange resin of the type specified essentially comprises a stable insoluble synthetic organic polymer, active acidic functional groups chemically bonded thereto and dissociable into free mobile cations to impart a negative charge to the polymer, and water in gel relationship with the polymer. Similarly, an anion exchange resin of the type specified essentially comprises a stable insoluble synthetic organic polymer, active basic functional groups chemically bonded thereto and dissociable into free mobil anions to impart a positive charge to the polymer, and water in gel relationship with the polymer. The active acidic functional groups attached to the associated organic polymer are oriented with respect to the interfaces thereof so as to be partially or completely dissociable in the internal gel water into fixed negative ions linked to the polymer and into mobile exchangeable positive ions; and similarly, the active basic functional groups attached to the associated organic polymer are oriented with respect to the interfaces thereof so as to be partially or completely dissociable in the internal gel water into fixed positive ions linked to the polymer and into mobile exchangeable negative ions.

Typical such polymers to which active acidic functional groups may be attached include: phenol-aldehyde resins, polystyrene-divinylbenzene copolymers, and the like; and such suitable active acidic functional groups include: —$SO_3H$, —COOH and the like; —$SO_3H$ being usually preferred because of its high dissociation constant. Typical such polymers to which active basic functional groups may be attached include: urea-formaldehyde resins, melamine-formaldehyde resins, polyalkylene-polyamine-formaldehyde resins, and the like; and such suitable active basic functional groups include: quaternary ammonium hydroxides, amino groups, the guanidyl group, the dicyanodiamidine group, and like organic nitrogen-containing basic groups, the quaternary ammonium hydroxide groups, the quanidine and the dicyanodiamidine residue being usually preferred because of their high dissociation constants. Normally the water in gel relationship with the polymer should be present in an amount of at least 15% of the weight of the dry resin.

As a constructional example of the unit 10, especially designed for use in dishwashing apparatus of the home appliance type, the internal diameter of the cathode 11 may be 3⅞"; the internal diameter of the barrier 13 may be 2¾"; the diameter of the anode may be ⅜"; the distance between the adjacent upper and lower surfaces of the plates 18 and 19 may be 6¾"; the other dimensions are appropriately related; and the volume of the bed 33 may be 0.02 cubic foot.

It is contemplated that this constructional example of the unit 10 will be incorporated in dishwashing apparatus, as disclosed in the previously-mentioned Stoddard application; whereby the water is conducted through the anode compartment 17 in a single demand and involving a time interval of about 30 seconds; whereby the flow control plug 54 may be constructed and arranged to accommodate the passage therethrough of three gallons per minute, thereby accommodating the passage of six quarts of anolyte through the anode chamber 17 in each cycle of operation of the dishwashing apparatus mentioned. On the other hand, the flow of the catholyte through the cathode compartment 16 may be continuous and at the exceedingly low rate of about 12 gallons per month. In this case, the direct current may be conducted from the anode 12 to the cathode 31 continuously at about 0.1 ampere by impressing a direct voltage between the anode 12 and the cathode 11 of about 7-volts; whereby the energy requirement of the unit 10 may have an average value of about 0.5 kilowatt-hour per month, this value being somewhat variable and dependent upon the character of the hard water being treated.

Turning now more particularly to the treatment of water in the unit 10, it is first noted that ordinary hard water contains dissolved metal salts, particularly salts of alkali earth metals, which electrolytes include such cations as: $Ca^{++}$, $Mg^{++}$, $Na^+$, $Fe^{++}$, etc., and such anions as: $Cl^-$, $HCO_3^-$, $CO_3^{--}$, $SO_4^{--}$, $NO_3^-$, etc. Hard water to be treated frequently contains a dissolved solids count of 250 p.p.m. and higher, comprising dissolvel electrolytes yielding the cations and the anions named; whereby it is totally unsuitable for use in the dishwashing apparatus mentioned for several reasons. In the first place, certain of these cations, particularly $Ca^{++}$ form precipitates with ordinary detergents and also with many food soils introduced into the dishwasher on the dishes; whereby the resulting solids are deposited upon the dishes producing undesirable films, stains, etc. Moreover, incident to drying of the dishes, the evaporation of the water films thereon causes the deposit of metal salts thereon, as it is apparent that when the solvent is evaporated the concentration of the cations and anions therein exceeds the solubility of the corresponding salts; whereby $CaCO_3$, for example, is deposited upon the dishes producing corresponding scale thereon. Now in the practical demineralization of hard water, it is not necessary to remove all of the dissolved solids but only to reduce the total dissolved solids to a tolerable value. For example, Chicago city water is only moderately hard containing about 135 p.p.m. of hardness ions (calculated as $CaCO_3$) and can be rendered altogether soft from a practical standpoint, by reducing the content of these hardness ions to 35 p.p.m. Restating the matter in terms of grains of hardness, Chicago city water is of 8 grains hardness; whereby the volume of the ion exchange bed 33 has a capacity for softening 87.5 gallons of Chicago city water, since this volume of the bed 34 has an absolute capacity of reacting with 700 grains of water hardness. Now during the long time interval when no anolyte is conducted through the anode compartment 17, the continuous passage of the direct electric current between the anode 12 and the cathode 11 effects regeneration of the resin incorporated in the bed 33, and it may be readily calculated that this regeneration is at least 10% of that of the total capacity of the bed 33; whereby it is apparent that the unit 10 is regenerated to accommodate the softening of 8.75 gallons of Chicago city water per day. Now even if the dishwashing apparatus mentioned were installed in an area having exceedingly hard water, such, for example, as a few areas having a water hardness as high as 25 grains, the regeneration capacity of the unit 10 is then reduced to only 2.9 gallons per day. However, the conduction of even this volume of anolyte through the anode chamber 17 of the unit 10 is not required in the cycle of the dishwashing apparatus mentioned.

In the above discussion, only the demineralization or softening of hard water has been referred to, but it will be understood that the electrolysis that proceeds in the unit 10 is effective moderately to reduce the pH of the anolyte and substantially to increase the pH of the catholyte; whereby the reduction in the pH of the anolyte serves another very important function in the operation of the dishwashing apparatus mentioned in that the rinse water involved in the automatic cycle thereof, being thoroughly acidified, is capable of dissolving previously deposited metal salts from the dishes undergoing the dishwashing operation, as it is apparent that the solubility of the metal salts is substantially increased as the pH of the final rinse solution is reduced with respect to neutrality. Thus this effect that is achieved in the dishwashing apparatus mentioned is most beneficial in obtaining a satisfactory appearance of the dishes at the conclusion of the washing cycle.

The foregoing considerations will be understood in conjunction with a brief description of the electrodialysis that occurs in the unit 10. More particularly, the cations of the electrolytes dissolved in the anolyte are transported by diffusion through the permeable barrier 13 into the catholyte by virtue of the attraction between the positive electrical charges and the cathode 11; and conversely, the anions of the electrolytes dissolved in the catholyte are transported by diffusion through the permeable barrier 13 into the anolyte by virtue of the attraction between the negative electrical charges and the anode 12. Thus the cations are preferentially extracted from the anolyte and accumulated in the catholyte, and the anions are preferentially extracted from the catholyte and accumulated in the anolyte. Of course, the extraction of cations from the anolyte, as well as the accumulation of anions therein, effects an increase in the hydrogen ion concentration in the anolyte; whereby the pH of this aqueous solution is correspondingly reduced and may be disposed within the range 4.0 to 5.0, in the operation of the unit 10; and conversely, the extraction of the anions from the catholyte, as well as the accumulation of cations therein, effects a decrease in the hydrogen ion concentration in the catholyte; whereby the pH of this aqueous solution is correspondingly increased and may be disposed within the range 9.0 to 10.0, in the operation of the unit 10. Of course, some oxygen is evolved at the anode 12 that is swept along with the anolyte through the tubular member 40; while some hydrogen is evolved at the cathode 11 that is swept along with the catholyte through the conduit 58.

During the conduction of the water through the bed 33 substantial amounts of the cations and the anions of the electrolytes dissolved in the raw water are respectively exchanged with hydrogen ions and hydroxyl ions respectively by the cation exchange resin particles and by the anion exchange resin particles, thereby correspondingly depleting respectively the cation exchange capacity of the cation exchange resin particles and the anion exchange capacity of the anion exchange resin particles. However, when the valve 56 in the supply pipe communicating with the anode compartment 17 is subsequently closed, the cation exchange resin particles and the anion exchange resin particles undergo partial regeneration, since the conduction of the direct current from the anode 12 to the cathode 11 is continuous. Specifically, the cation exchange resin particles are regenerated by the release of the cations of the previously exchanged metal salts and by the recapture of hydrogen ions from the anolyte, which cations diffuse through the permeable barrier 13 into the continuously flowing catholyte and are transported to the exterior of the unit 10, as previously explained. Similarly, the anion exchange resin particles are regenerated by the release of the anions of the previously exchanged metal salts and by the recapture of hydroxyl ions from the anolyte, which anions accumulate in the anolyte with the ultimate formation of oxygen molecules dispersed therethrough.

The arrangement of the mixed resin bed 33 in the anode chamber 17 is very advantageous as it materially reduces the internal resistance of the unit 10 between the anode 12 and the cathode 11 greatly facilitating the migration of both the cations and the anions through the permeable barrier 13, whereby the heating of the anolyte and the catholyte passing through the unit 10 is greatly minimized; thereby drastically reducing the energy requirements thereof. Although the phenomenon is not altogether understood, it is surmised that the resins in the mixed resin bed 33 constitute solid poly-electrolytes for the transportation of the ions; and specifically, it is visualized that the cations are involved in a great multiplicity of exchanges with a considerable number of the individual cation exchange particles in their migration toward the cathode 11, and that the anions are involved in a great multiplicity of exchanges with a considerable number of the individual anion exchange particles in their migration toward the anode 12; the mechanism involved being visualized as like the mode employed in playing the child's game of "musical chairs." In this mechanism, it is suggested that the energy required to effect the successive ion exchanges of a great number of the ions in the mixed resin bed 33 and the consequent transportation of a great number of the ions between the anolyte and the catholyte is very small compared to the energy required to effect the direct migration of the same given number of ions through the same distance in the anolyte or in the catholyte, due fundamentally to the fact that in the direct migration of the ions there must be a great amount of energy lost through random collision by the ions with water molecules and the ions must expend a great amount of work upon these dipolar molecules in passing therethrough. In any case, and without reference to the exact mechanism involved, the utilization of the mixed resin bed 33 in the anode chamber 17 drastically reduces the energy requirements of the unit 10 with respect to the requirements thereof in the absence of the mixed resin bed 33 to effect the same total ion exchange. Moreover, the provision of the mixed resin bed 33 permits a substantial reduction in the size of the unit 10 as it in effect permits the accumulation or storage of ion exchange capacity during the extremely long time interval during which the anolyte is not actively conducted through the anode compartment 17. In this connec-tion, it is noted that the continuous conduction of the catholyte through the cathode chamber 16 is very important as the arrangement insures that the ion exchange bed 33 remains wet at all times and in readiness to effect the required ion exchange when the anolyte is conducted through the anode chamber 17 during the short time interval, as it will be recalled that in these polymeric ion exchange resins water must be maintained in gel relationship with respect thereto, as the ion exchange mechanism thereof involves the utilization of this water in gel relationship therewith. In other words, it is important that the ion exchange bed 33 be flooded with water at all times so that it is in readiness to perform the required ion exchange function at all times.

Recapitulating, in conjunction with the operation of the unit 10: the raw Chicago city water in the supply pipe connected to the member 47 may contain 8 grains of hardness and have a pH of 7.0; whereas the anolyte that is conducted through the anode chamber 17 and employed in the automatic cycle of the dishwashing apparatus mentioned may contain about 2 grains of hardness and have a pH within the approximate range 4.0 to 5.0. In passing, it is noted that the catholyte that is conducted through the cathode chamber 16 is flushed into the drain plumbing of the dishwashing apparatus mentioned, as such is useful to bring about the saponification of the higher fatty acids of animal and vegetable origin that tend to collect and cake therein, since the catholyte has a pH well in the base range, as previously noted. The raw water that is supplied into the anode chamber 17 may have a pressure of about 25 p.s.i., and the flow control plug 54 accommodates the flow through the anode chamber 17 at a rate of about 12 quarts per minute; while the raw water that is supplied via the valve 59 into the cathode chamber 16 flows at an exceedingly small rate of about 12 gallons per month. Accordingly, the total quantities and the flow rates of the water through the respective cathode chamber 16 and the anode chamber 17 are altogether disproportional in the normal operation of the dishwashing apparatus mentioned. Specifically, the catholyte is conducted continuously through the cathode chamber 16 in a total quantity of about 12 gallons in a period of 1 month or 30 days; whereas the anolyte is conducted intermittently through the anode chamber 17 about once per day or 30 times per month and in the total quantity of about 90 gallons in the period of 1 month or 30 days. Thus the conduction of the catholyte through the cathode chamber 16 is at a rate of about $2.8 \times 10^{-4}$ gallons per minute, while the conduction of the anolyte through the anode chamber 17 is at a rate of about 3.0 gallons per minute; whereby the rate of flow of the anolyte through the anode chamber 17 is about 10,000 times as great as the rate of flow of the catholyte through the cathode chamber 16. However, the arrangement is entirely feasible, since the flow of the anolyte at its relatively high rate through the anode chamber 17 occurs only for about 1 minute in each twenty-four hour period; whereas the flow of the catholyte at its exceedingly low rate through the cathode chamber 16 occurs continuously; the ion exchange bed 33 has a high rate of expenditure of its accumulated capacity to exchange ions; and the ion exchange bed 33 is under continuous regeneration at the low rate involving the continuous conduction therethrough of the direct electric current of about 0.1 amp.

Finally, it is pointed out in conjunction with the operation of the unit 10 that it may be arranged either preceding or following a hot water heater, whereby the raw water supplied thereto may be the ambient temperature of about 50° F., or the elevated temperature of about 160° F. in the respective locations noted.

While the construction and utilization of the unit 10 have been described in conjunction with dishwashing apparatus, because of the divisional character of the present application, it will be understood that it is of general utility for the production from ordinary hard water of separate and distinct aqueous acid and base solutions of the character specified, that may be employed for other purposes.

The construction and arrangement of the unit 10 is disclosed and claimed in the copending combination divisional and continuation-in-part application of Edgar S. Stoddard, Serial No. 734,971, filed May 13, 1958.

In view of the foregoing, it is apparent that there has been provided an improved method of producing separate and distinct aqueous acid and base solutions from ordinary hard water, that is particularly useful in conjunction with dishwashing apparatus, or the like.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of treating raw water containing small amounts of dissolved metal salts in an electrolytic cell comprising a permeable diaphragm defining a cathode chamber and an anode chamber on opposite sides thereof and including a mixed ion exchange bed in said anode chamber; said method comprising: (1) conducting continuously during a time interval T a small quantity Q1 of said raw water at a relatively low rate of flow R1 through said cathode chamber into wetting relation with said diaphragm; (2) conducting intermittently during said time interval T a large quantity Q2 of said raw water at a relatively high rate of flow R2 through said anode chamber into wetting relation with said diaphragm and into ion exchange relation with said bed; and (3) conducting continuously during said time interval T a direct electric current from the water in said anode chamber into the water in said cathode chamber and through said bed and said diaphragm, whereby two aqueous solutions S1 and S2 respectively result from said two quantities Q1 and Q2 of said raw water, and whereby the proportions of the cations and anions of said metal salts in said two solutions S1 and S2 are substantially modified respectively in reverse directions with respect to that in said raw water.

2. The method set forth in claim 1, wherein the ratio between the rates $R1/R2 < 1/1000$.

3. The method set forth in claim 1, wherein said bed comprises a loosely packed mass of first discrete particles of cation exchange material and of second discrete particles of anion exchange material.

4. The method set forth in claim 3, wherein said cation exchange material consists essentially of synthetic organic polymeric cation exchange resin and said anion exchange material consists essentially of synthetic organic polymeric anion exchange resin.

5. The method set forth in claim 1, wherein said solution S1 constitutes a catholyte having a pH above 7.0 and said solution S2 constitutes an anolyte having a pH below 7.0.

6. The method of treating raw water containing small amounts of dissolved metal salts in an electrolytic cell comprising a permeable diaphragm defining a cathode chamber provided with a cathode and an anode chamber provided with an anode and including a mixed ion exchange bed in said anode chamber; said method comprising: (1) continuously conducting a first stream of said raw water at a relatively low rate of flow through said cathode chamber into wetting relation with one side of said diaphragm and with said cathode; (2) intermittently conducting a second stream of said raw water at a relatively high rate of flow through said anode chamber into wetting relation with the other side of said diaphragm and with said anode and into ion exchange relation with said bed; and (3) continuously conducting a direct electric current from said anode to said cathode and through said bed and said diaphragm and through said first and second streams of said raw water, whereby first and second streams of aqueous solutions respectively result from said first and second streams of said raw water, and whereby the proportions of the cations and the anions of said metal salts in said first and second streams of aqueous solutions are substantially modified respectively in reverse directions with respect to that in said raw water, so that said first stream of aqueous solution has a pH substantially higher than that of said raw water and said second stream of aqueous solution has a pH substantially lower than that of said raw water.

7. The method set forth in claim 6, wherein the cation exchange material in said bed consists essentially of synthetic organic polymeric cation exchange resin, and the anion exchange material in said bed consists essentially of synthetic organic polymeric anion exchange resin.

8. The method set forth in claim 6, wherein the temperature of the raw water in the first and second streams respectively conducted through said first and second chambers is well below 100° F.

9. The method set forth in claim 6, wherein the temperature of the raw water in the first and second streams respectively conducted through said first and second chambers is well above 100° F.

References Cited in the file of this patent

UNITED STATES PATENTS

| | | |
|---|---|---|
| 2,502,614 | Zender | Apr. 4, 1950 |
| 2,546,254 | Briggs | Mar. 27, 1951 |
| 2,681,885 | Briggs | June 22, 1954 |
| 2,741,591 | Dewey et al. | Apr. 10, 1956 |
| 2,763,607 | Staverman | Sept. 18, 1956 |

FOREIGN PATENTS

| | | |
|---|---|---|
| 1,066,583 | France | Jan. 20, 1954 |

OTHER REFERENCES

Industrial and Engineering Chemistry, vol. 47, No. 1, January 1955, pp. 61 to 67, by Walters et al.